United States Patent Office 3,104,264
Patented Sept. 17, 1963

3,104,264
MANUFACTURE OF DIARYLALKYL
PHOSPHINE OXIDES
James Leonard Willans, Abingdon, England, assignor to United Kingdom Atomic Energy Authority, London, England
No Drawing. Filed Feb. 5, 1962, Ser. No. 171,307
Claims priority, application Great Britain Feb. 9, 1961
3 Claims. (Cl. 260—606.5)

This invention relates to the manufacture of diarylalkyl phosphine oxides. These compounds are tertiary phosphine oxides of generic formula: $RR'R''PO$ where R and R' are aromatic radicals, R'' is an alkyl or aralkyl radical, and R may be different from R'.

Diarylalkyl phosphine oxides have been prepared by a number of routes:

(1) The action of diarylphosphinyl chlorides on alkyl magnesium bromides, e.g.:

$$(C_6H_5)_2\overset{O}{\underset{}{P}}Cl + C_4H_9MgBr \longrightarrow (C_6H_5)_2(C_4H_9)PO$$

(2) The action of diarylchlorophosphines on alkyl magnesium bromides, and the subsequent oxidation of the resulting diarylalkyl phosphine with hydrogen peroxide, e.g.:

$$(C_6H_5)_2PCl + C_6H_{13}MgBr \longrightarrow$$
$$(C_6H_5)_2(C_6H_{13})P \overset{O}{\longrightarrow} (C_6H_5)_2(C_6H_{13})PO$$

(3) The decomposition of quaternary phosphonium compounds, as for example, when tris-(o-methoxyphenyl) methyl phosphonium iodide is treated with a strong aqueous solution of potassium hydroxide:

$$[(o\text{-}CH_3OC_6H_4)_3P.CH_3]^+I^- \rightarrow$$
$$(o\text{-}CH_3OC_6H_4)_2(CH_3)PO + o\text{-}CH_3OC_6H_4I$$

The tertiary phosphine oxides are, as a class of chemical compounds, usually very stable and are useful as solvent-extraction reagents for metals, e.g. uranium, and are also useful per se, or as intermediates, in the production of insecticides, plasticisers, oil-additives and other products for which non-ionic phosphorylated compounds, e.g. the neutral organic phosphate esters, are known to be useful. One of the disadvantages to their more general use is the high cost of manufacture.

McCormack (U.S. Patents 2,663,737 and 2,663,738) has prepared a series of stable liquid phosphine oxides by the cyclic addition of phenyldichlorophosphine to butadienes.

$$CH_2=CH-CH=CH_2 + C_6H_5PCl_2 \longrightarrow$$

$$C_6H_5-P\begin{matrix}Cl\\ \\ Cl\end{matrix}\begin{matrix}CH_2-CH\\ \| \\ CH_2-CH\end{matrix} \xrightarrow{H_2O} C_6H_5-P\begin{matrix}O\\ \uparrow \\ \end{matrix}\begin{matrix}CH_2-CH\\ \| \\ CH_2-CH\end{matrix}$$

One object of this invention is to provide another simple and inexpensive method of producing tertiary phosphine oxides.

According to the invention a method of manufacturing a diarylalkyl or diarylaralkyl tertiary phosphine oxide comprises the steps of adding a mixture of a diarylphosphine oxide and an alkyl or aralkyl halide to a solution of an alkali metal alkoxide in an alkanol, and isolating the said tertiary phosphine oxide from the reaction mixture.

The reaction takes place as follows:

$$RR'PHO + R''X + MOR''' \rightarrow RR'R''PO + MX + R'''OH$$

where R and R' are aromatic radicals, R'' is an alkyl or aralkyl radical, R''' is an alkyl radical, M is an alkali metal and X is chlorine, bromine or iodine R and R' may be, for example, phenyl, tolyl, ethylphenyl, propylphenyl, butylphenyl, amylphenyl, hexylphenyl or methoxyphenyl radicals and R may be different from R'; while R'' may be, for example, a methyl, ethyl, propyl, butyl, amyl, hexyl heptyl, octyl, nonyl, decyl, undecyl, or dodecyl radical or a benzyl radical. It is preferred to use as the compound R''X a normal alkyl bromide or iodide, or one of the more reactive chlorides, for example, benzyl chloride. The preferred alkali metal alkoxides are the sodium and potassium alkoxides. The alkoxide may be formed by dissolving the alkali metal or its hydroxide in the corresponding alkanol. The following examples include preferred ways of carrying the invention into effect, the parts being by weight.

Example I

A mixture of one part diphenylphosphine oxide and 0.744 part benzyl chloride is added dropwise during half an hour to a stirred solution of 0.27 part sodium metal dissolved in 4.64 parts ethanol. The ethanol is removed from the reaction mixture by distillation, under reduced pressure from a steam bath, and 11.8 parts water added to the residue remaining in the flask. The white precipitate is isolated at the pump and given several washings with water to remove the excess alkalinity. The diphenylbenzylphosphine oxide is dried in an oven at 100° C. and recrystallised from 3.25 parts of ethanol to yield (75% theory) a white crystalline compound melting at 194–6° C.

Example II

When the mixture of diphenylphosphine oxide and benzyl chloride in Example I is added to a stirred solution of 0.47 part of sodium hydroxide pellets dissolved in 4.6 parts ethanol a 67% yield of white crystalline material is obtained which melts at 194–6° C. and does not depress the melting point of an authentic sample of diphenylbenzylphosphine oxide prepared by an alternative method.

Example III

A mixture of one part diphenylphosphine oxide and 0.91 part n-octylbromide is added dropwise during half an hour to a stirred solution of 0.228 part sodium metal dissolved in 4.6 parts ethanol. The ethanol is removed from the reaction mixture by distillation, under reduced pressure, from a steam bath and 11.0 parts of water is added to the residue remaining in the reaction flask. The upper oily layer is separated from the lower aqueous alkaline layer which is then extracted with 13.4 parts benzene. The benzene extract is added to the separated oil and the resulting solution washed with water, dried over anhydrous sodium sulphate and filtered. The benzene solvent is removed from the product under reduced pressure, by distillation from a steam bath. The remaining diphenyloctyl phosphine oxide is run into 2.32 parts of low boiling petroleum ether where it solidifies to yield (73.6% theory) a white low melting solid M.P. 63–64°.

Example IV

When the mixture of diphenyl phosphine oxide and n-octyl bromide in Example III is added to a stirred solution of 0.47 sodium hydroxide pellets dissolved in 4.6 parts ethanol a 65% yield of diphenyloctylphosphine oxide is isolated from the reaction mixture.

Example V 0.68 part n-butyl bromide used in place of the 0.91 part n-octylbromide in Example III yields (50% theory) diphenylbutyl phosphine oxide M.P. 88–89° C. from the reaction mixture.

The diaryl phosphine oxides used as starting materials in the method of this invention can be manufactured by the method described in copending U.K. application No. 4,892/61, U.S. patent application Serial No. 171,308, filed February 5, 1962, and purified as described in co-pending U.K. application No. 4,893/61, U.S. patent application Serial No. 171,306, filed February 5, 1962.

I claim:

1. A method of manufacturing a tertiary phosphine oxide of the group consisting of the diarylalkyl and diarylaralkyl phosphine oxides comprising the steps of adding a mixture of a diarylphosphine oxide and a halide of the group consisting of the alkyl and aralkyl halides to a solution of an alkali metal alkoxide in an alkanol, and isolating the said tertiary phosphine oxide from the reaction mixture.

2. A method of manufacturing a diaryl-n-alkyl tertiary phosphine oxide comprising the steps of adding a mixture of a diarylphosphine oxide and a normal alkyl halide of the group consisting of the normal alkyl bromides and iodides to a solution of an alkali metal alkoxide in an alkanol, and isolating the said tertiary phosphine oxide from the reaction mixture.

3. A method of manufacturing a diarylbenzyl phosphine oxide comprising the steps of adding a mixture of a diarylphosphine oxide and benzyl chloride to a solution of an alkali metal alkoxide in an alkanol, and isolating the diarylbenzyl phosphine oxide from the reaction mixture.

No references cited.